United States Patent
Lee

(10) Patent No.: US 7,356,099 B2
(45) Date of Patent: Apr. 8, 2008

(54) METHOD FOR PROCESSING PROTOCOL DATA UNITS IN A HIGH-SPEED DOWNLINK PACKET ACCESS COMMUNICATION SYSTEM

(75) Inventor: Kang-Gyu Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 727 days.

(21) Appl. No.: 10/748,766

(22) Filed: Dec. 30, 2003

(65) Prior Publication Data

US 2005/0047525 A1 Mar. 3, 2005

(30) Foreign Application Priority Data

Aug. 25, 2003 (KR) .................. 10-2003-0058885

(51) Int. Cl.
*H03D 1/00* (2006.01)
*H04L 27/06* (2006.01)

(52) U.S. Cl. .................. 375/342; 375/340; 370/335; 370/342

(58) Field of Classification Search .................. 375/316, 375/340, 342; 370/335, 342
See application file for complete search history.

(56) References Cited

U.S. PATENT DOCUMENTS

| 6,512,747 | B1* | 1/2003 | Umeuchi et al. ........ 370/310.1 |
| 6,901,063 | B2* | 5/2005 | Vayanos et al. ............ 370/335 |
| 2002/0110095 | A1* | 8/2002 | Jiang et al. .................. 370/328 |
| 2002/0126629 | A1* | 9/2002 | Jiang et al. .................. 370/328 |

* cited by examiner

*Primary Examiner*—Phuong Phu
(74) *Attorney, Agent, or Firm*—The Farrell Law Firm, PC

(57) ABSTRACT

A method for processing PDUs (Protocol Data Units) in a receiver, which can receive a PDU to which a TSN (Transmission Sequence Number) is allocated from a transmitter provided in an HSDPA (High-Speed Downlink Packet Access) communication system and store the received PDU in a reordering buffer. A receiver window size associated with the received PDU is set. When a sum of a TSN of the PDU at an upper edge of the receiver window and a value of the set receiver window size is larger than a value of a total TSN size where the TSN of the PDU from the transmitter is outside the receiver window, a corresponding PDU is allowed to be appropriately received if a TSN of the corresponding PDU is within a predetermined range even though the TSN of the corresponding PDU is smaller than the TSN at the upper edge of the receiver window.

6 Claims, 8 Drawing Sheets

METHOD FOR PROCESSING PROTOCOL DATA UNITS IN A HIGH-SPEED DOWNLINK PACKET ACCESS COMMUNICATION SYSTEM

PRIORITY

This application claims priority to an application entitled "METHOD FOR PROCESSING PROTOCOL DATA UNITS IN HIGH-SPEED DOWNLINK PACKET ACCESS COMMUNICATION SYSTEM", filed in the Korean Intellectual Property Office on Aug. 25, 2003 and assigned Ser. No. 2003-58885, the contents of which are hereby incorporated by reference.

BACKGROUND OF THE INVENTION

1. Field of the Invention

The present invention relates generally to a communication system using an HSDPA (High-Speed Downlink Packet Access) scheme, and more particularly to a method for processing MAC (Medium Access Control)-hs (high speed). In 3GPP TS.25.321, MAC-hs is a MAC entity for handling HSDPA. PDUs (Protocol Data Units).

2. Description of the Related Art

Conventionally, an HSDPA (High-Speed Downlink Packet Access) apparatus, system, and method are associated with an HS-DSCH (High Speed-Downlink Shared CHannel) and at least one control channel associated with the HS-DSCH for supporting high-speed downlink packet transmission in a WCDMA (Wideband Code Division Multiple Access) communication system. A HARQ (Hybrid Automatic Retransmission Request) scheme, for example, has been proposed to support the HSDPA scheme. A structure of the WCDMA communication system and the HARQ scheme will be described with reference to FIG. 1.

FIG. 1 is a block diagram illustrating a structure of the conventional WCDMA communication system. The WCDMA communication system includes a core network 100, a plurality of RNSs (Radio Network Subsystems) 110 and 120, and a UE (User Equipment) 130. The RNSs 110 and 120 are configured by RNCs (Radio Network Controllers) and a plurality of Node-Bs in which each Node-B can be referred to as a cell. For example, the RNS 110 includes the RNC 111 and a plurality of Node-Bs 113 and 115. An RNC is referred to as an SRNC (Serving RNC), a DRNC (Drift RNC), or a CRNC (Controlling RNC) according to the RNC's function. Alternatively, the SRNC and the DRNC can be classified according to the UE's role. The SRNC is an RNC for managing UE information and communicating data with the core network. When UE data is transmitted to the SRNC through an RNC not functioning as the SRNC and is received from the SRNC through an RNC not functioning as the SRNC, the above-described RNC is the DRNC. The CRNC is an RNC controlling Node-Bs. Referring to FIG. 1, the RNC 111 becomes the SRNC upon managing information of the UE 130. When data of the UE 130 is transmitted and received through the RNC 112 while the UE 130 is in motion, the RNC 112 becomes the DRNC. The RNC 111 controlling the Node-B 113 becomes the CRNC for the Node-B 113.

Herein below, a HARQ (Hybrid Automatic Retransmission Request) process, i.e., an n-channel SAW HARQ (Stop And Wait Hybrid Automatic Retransmission Request) process, will be described. A conventional ARQ process is based on ACK (positive acknowledgement) information between the UE and the RNC and retransmission packet data exchange. The HARQ process uses an FEC (Forward Error Correction) to enhance transmission efficiency of the ARQ process. Further, the ACK information and the retransmission packet data are exchanged through a MAC-based HS-DSCH between the UE and the Node-B in the HSDPA scheme. Furthermore, the HSDPA process configures n number of logical channels (herein below these are not the logical channels between MAC and RLC that 3GPP release5 mentions) and uses the n-channel SAW HARQ process capable of transmitting a plurality of packet data in a state where no ACK information is received.

The SAW HARQ process can transmit a next packet only when the ACK information for a previous packet is received. However, there is a drawback in that the efficiency of channel use is low because the next packet data is transmitted only after the ACK information for the previous packet data is received.

The n-channel SAW HARQ process can consecutively transmit a plurality of packets through different channels when the ACK information is not received, thereby improving the channel use efficiency. If the n logical channels between UE and a Node-B are configured and the channels are identified by specified times or channel numbers in the n-channel SAW HARQ process, the UE receiving the packet data can identify a certain channel to which a received packet belongs at an arbitrary point in time. Moreover, the UE can re-configure received packets in order and take necessary actions such as an operation of combining corresponding packet data, etc.

An operation of the n-channel SAW HARQ process will be described in more detail herein below with reference to FIG. 1. It is assumed that a 4-channel SAW HARQ process is carried out between an arbitrary Node-B 113 and the UE 130, and logical identifiers "1" to "4" are allocated to respective channels.

Referring to FIG. 1, a MAC (Medium Access Control) layer between the UE 130 and the Node-B 113 has a HARQ processor corresponding to each channel. The Node-B 113 allocates a channel identifier "1" to a first transmitted coded block and transmits it to the UE 130. If an error has been generated in a corresponding coded block transmitted with the allocated channel identifier "1", the UE 130 transfers a coded block to the first HARQ processor corresponding to the channel identifier "1", and transmits NACK (Negative Acknowledgement) information to a channel 1 associated with the channel identifier "1".

At this time, the Node-B 113 transmits a subsequently coded block to a channel 2 irrespective of the reception of the ACK information for the coded block of the channel 1. If an error has also been generated in the subsequently coded block, the coded block is transferred to a corresponding HARQ processor.

Upon receiving the NACK information for the coded block of the channel 1 from the UE 130, the Node-B 113 retransmits a corresponding coded block to the channel 1. Thus, the UE 130 transfers the retransmitted coded block to the first HARQ processor 1 after identifying the retransmission of the coded block associated with a previously transmitted coded block using a channel identifier of the coded block through the channel 1. The first HARQ processor 1 of the UE 130 combines the first transmitted coded block previously stored and the retransmitted coded block.

As described above, the n-channel SAW HARQ process corresponds a channel identifier to a HARQ processor with one-to-one correspondence. By not delaying user data transmission before the ACK information is received, the n-channel SAW HARQ process can appropriately correspond the first transmitted coded block to the retransmitted coded block.

The architecture of layers for the WCDMA communication system using the HSDPA scheme requires a HARQ (Hybrid Automatic Retransmission Request) function in addition to a MAC layer, and the layer architecture associated with the HARQ function has developed from the existing layer architecture of the WCDMA communication system without using the HSDPA scheme. To support the HSDPA scheme, a MAC-hs entity has been implemented in addition to MAC-c/sh (control and shared) and MAC-d (dedicated) entities in the MAC layer architecture of the conventional WCDMA communication system.

FIG. 2 is a view illustrating the MAC-hs layer architecture of a UE side in a CDMA communication system using the HSDPA scheme. Referring to FIG. 2, a MAC-hs layer 115 performs a major function for performing a HARQ process on an HS-DSCH to support the HSDPA scheme. The MAC-hs layer 115 transmits ACK information to a Node-B if an error is not detected in a data block received from a radio channel, i.e., packet data, and generates NACK information for requesting that the data block be retransmitted so that the NACK information to the Node-B can be transmitted. The MAC-hs layer 115 receives setting information from an RRC (Radio Resource Control) layer.

A data block transferred to the MAC-hs layer 115 through the HS-DSCH is stored in one of several HARQ processes within a HARQ entity. At this time, it can be determined from a HARQ process identifier contained in a downlink control signal, which HARQ process must store the data block. The HARQ process storing the data block transmits the NACK information to a UTRAN (UMTS (Universal Mobile Telecommunications System) Terrestrial Radio Access Network) side if an error is detected in the data block, and requests that the data block be retransmitted. However, the HARQ process storing the data block transmits the data block to a reordering entity if no error is detected in the data block, and transmits the ACK information to the UTRAN side. Reordering entities are arranged on a priority-by-priority basis like transmission buffers of the UTRAN side, and the HARQ process transmits the data block to a corresponding reordering entity through a priority class identifier contained in the data block. The characteristics of the reordering entity are designed to support a function for sequentially transferring data items.

Data blocks are sequentially transferred to a higher layer according to TSNs (Transmission Sequence Numbers). If a previous data block before a corresponding data block is not received, the corresponding data block is stored in a reordering buffer and then the corresponding data blocks are transferred to the higher layer when all previous data blocks are received. Typically, because a plurality of HARQ processes are operated, the reordering entities non-sequentially receive data blocks. Therefore, the reordering entities require reordering buffers to sequentially transfer the data blocks to the higher layer. The data blocks of predetermined TSNs are maintained in the reordering buffers. Where a data block cannot be transferred to the higher layer because one or more data blocks corresponding to TSNs lower than the TSN of the data block are maintained in the reordering buffer, a process can stall.

For example, if 6 bits are allocated for the TSN, because the number of bits allocated for the TSN is definite, the TSN has a value between 0 and 63. In the high-speed downlink HARQ system, a transmitter can transmit several hundred data blocks having the same priority to the same receiver during a very short time. Thus, the TSN repeatedly uses a value between 0 and 63. A wrap around associated with a definite bit indication for the TSN can be ambiguous. If the receiver does not have an appropriate mechanism, a determination cannot be made as to whether received data blocks are associated with the same cycle or different cycles.

To address the stall and wrap around problem, a mechanism based on a window is well known. The window-based mechanism sets a window of TSNs. A value of the set window size is smaller than a value of the total TSN size. According to an ideal condition in the window-based mechanism, the transmitter transmits data blocks with the TSNs within a transmitter window, and the receiver receives data blocks with the TSNs within the receiver window.

FIG. 3A illustrates a method for enabling the transmitter to process data blocks according to a transmitter window in an HSDPA communication system; and FIG. 3B illustrates a method for enabling the receiver to process data blocks according to a receiver window in the HSDPA communication system.

Referring to FIG. 3A, after the transmitter (being the Node-B) transmits a corresponding MAC-hs PDU where TSN=SN in the high-speed downlink packet access communication system, the data blocks with TSN≦SN−TRANSMIT_WINDOW_SIZE are not retransmitted so that sequence number ambiguity can be avoided in the receiver. "SN" stands for a sequence number of any MAC-hs PDU. Because SN=10 and TRANSMIT_WINDOW_SIZE=8 in FIG. 3A as an example, (SN−TRANSMIT_WINDOW_SIZE)=2. Accordingly, the transmitter does not transmit a data block with a TSN smaller than 2.

Referring to FIG. 3B, if a received MAC-hs PDU has TSN=SN and the received data block has not been previously received, the receiver (being the UE) stores the received data block at a position indicated by the TSN in the reordering buffer. Further, because TSN=SN associated with the received MAC-hs PDU is outside the receiver window size, the received data block is stored at a position indicated by an SN higher than the highest-order TSN. Further, the receiver shifts a receiver window so that an SN of the received data block can form an upper edge of the receiver window, and transfers data blocks with TSN≦(SN−RECEIVE_WINDOW_SIZE) to the higher layer.

FIG. 4 illustrates a method for enabling the conventional receiver to process a data block according to a receiver window size in the HSDPA communication system. When TSN=SN for a received MAC-hs PDU as described above is outside the receiver window, the conventional receiver stores a data block in a position indicated by an SN higher than the highest-order TSN. When the receiver window has TSNs illustrated in FIG. 4, the receiver determines that the MAC-hs PDU with a TSN "1" has been previously received because the TSN "1" is smaller than a TSN "55" for the lower edge of the receiver window when the transmitter transmits the MAC-hs PDU with the TSN "1".

The conventional transmitter does not retransmit MAC-hs PDUs with TSN≦(SN−TRANSMIT_WINDOW_SIZE) to avoid sequence number ambiguity. However, the conventional receiver does not consider all the cases where data blocks with TSNs smaller and larger than TSNs of a current receiver window according to the receiver window size. In other words, the conventional receiver only considers the case where a MAC-hs PDU with a TSN larger than TSNs of the current receiver window is received.

SUMMARY OF THE INVENTION

Therefore, the present invention has been designed in view of the above and other problems, and it is an object of the present invention to provide a method for processing PDUs (Protocol Data Units), which can avoid sequence number ambiguity when UE (User Equipment) of a receiver manages SNs (Sequence Numbers) by enabling the receiver (i.e., a MAC-hs entity of the UE) to consider both sides of a receiver window (associated with TSNs (Transmission Sequence Numbers) being smaller and larger than a receiver window size).

In accordance with one aspect of the present invention, the above and other objects can be accomplished by a method for processing PDUs (Protocol Data Units) in a receiver, which receives a PDU to which a TSN (Transmission Sequence Number) is allocated from a transmitter provided in an HSDPA (High-Speed Downlink Packet Access) communication system and stores the received PDU in a reordering buffer, said method comprising the steps of setting a size of a receiver window associated with the received PDU; and when a sum of a TSN of the PDU at an upper edge of the receiver window and a value of the set receiver window size is larger than a value of a TSN size where the TSN of the PDU from the transmitter is outside the receiver window, receiving a corresponding PDU, if a TSN of the corresponding PDU is within a predetermined range even though the TSN of the corresponding PDU is smaller than the TSN at the upper edge of the receiver window.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the annexed drawings. In the following description, a detailed description of known functions and configurations incorporated herein will be omitted when it may make the subject matter of the present invention rather unclear.

A transmitter does not retransmit MAC-hs PDUs corresponding to a previous transmitter window size before a transmitter window size currently managed in a conventional HSDPA (High-Speed Downlink Packet Access) communication system. However, a receiver must consider the case where the MAC-hs PDUs of the previous transmitter window size are received. Further, because a TSN (Transmission Sequence Number) proposed in the current 3GPP (Third Generation Partnership Project) Release 5 is limited to 6 bits (corresponding to a value between 0 and 63), the case where the TSN is set to 0 must be considered after the TSN is set to 63.

In other words, when MAC-hs PDUs corresponding to right and left sides of a receiver window currently managed by a UE (User Equipment) are received, a procedure for processing the received PDUs is performed as described below.

A method for processing the PDUs in accordance with the present invention will now be described. The terms used in the detailed description and annexed drawings are defined as in the following.

"RcvWindow_UpperEdge" represents the highest TSN of TSNs of all MAC-hs PDUs received by UE, i.e., a receiver side, without an error. Here, the MAC-hs PDUs are present in a state where they are not transferred to a higher layer. The "RcvWindow_UpperEdge" can be referred to as "RWUE".

"Receiver Window Size" represents the size of a receiver window. The "Receiver Window Size" can be referred to as "RWS".

The range of "Receiver Window" represents a set of MAC-hs PDUs with TSNs going from (RWUE−Receiver_Window_Size+1) to RWUE.

"Next_Expected_TSN" is a TSN subsequent to the TSN of the last MAC-hs PDU sequentially received for in-sequence delivery. The "Next_Expected_TSN" can be referred to as "NET".

Figure 1:
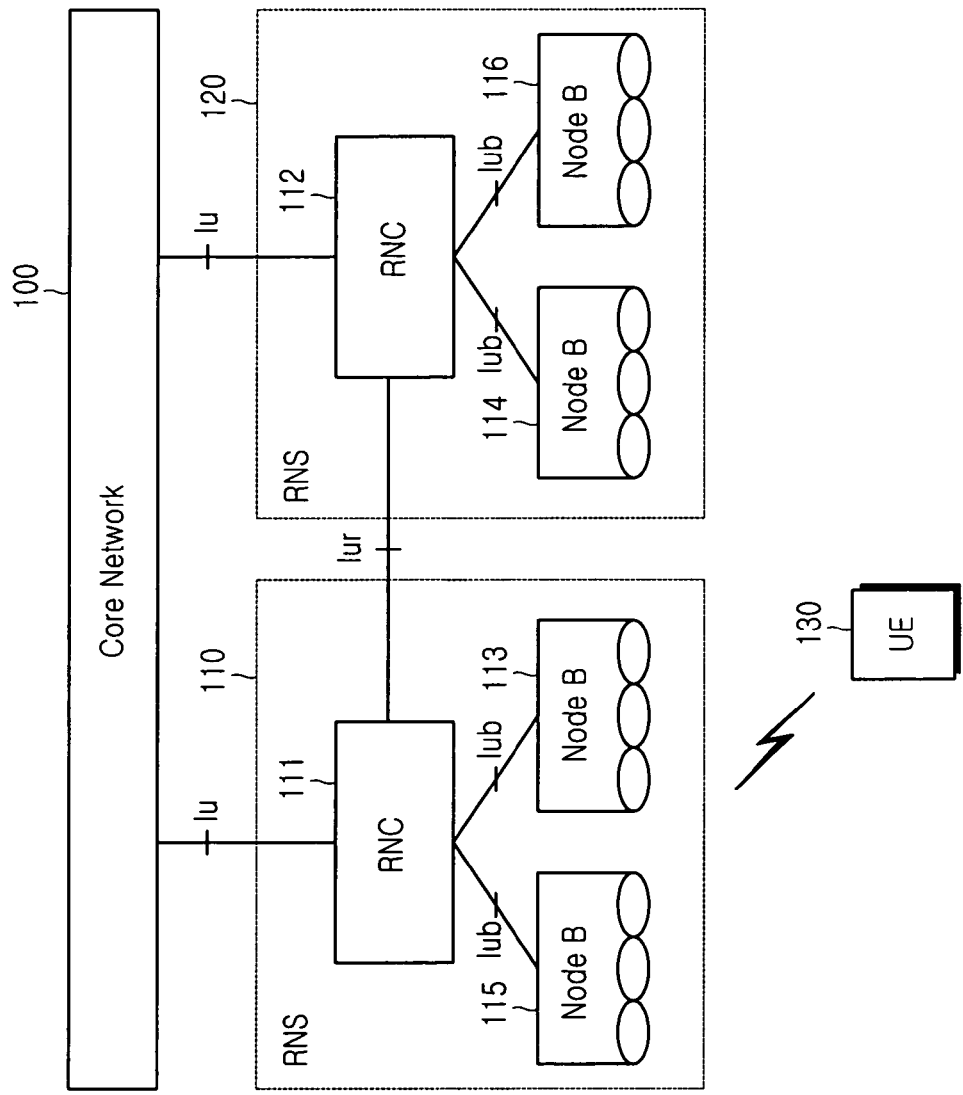
FIG. 1 is a block diagram illustrating the structure of a conventional UMTS (Universal Mobile Telecommunications System) communication system.
Figure 2:
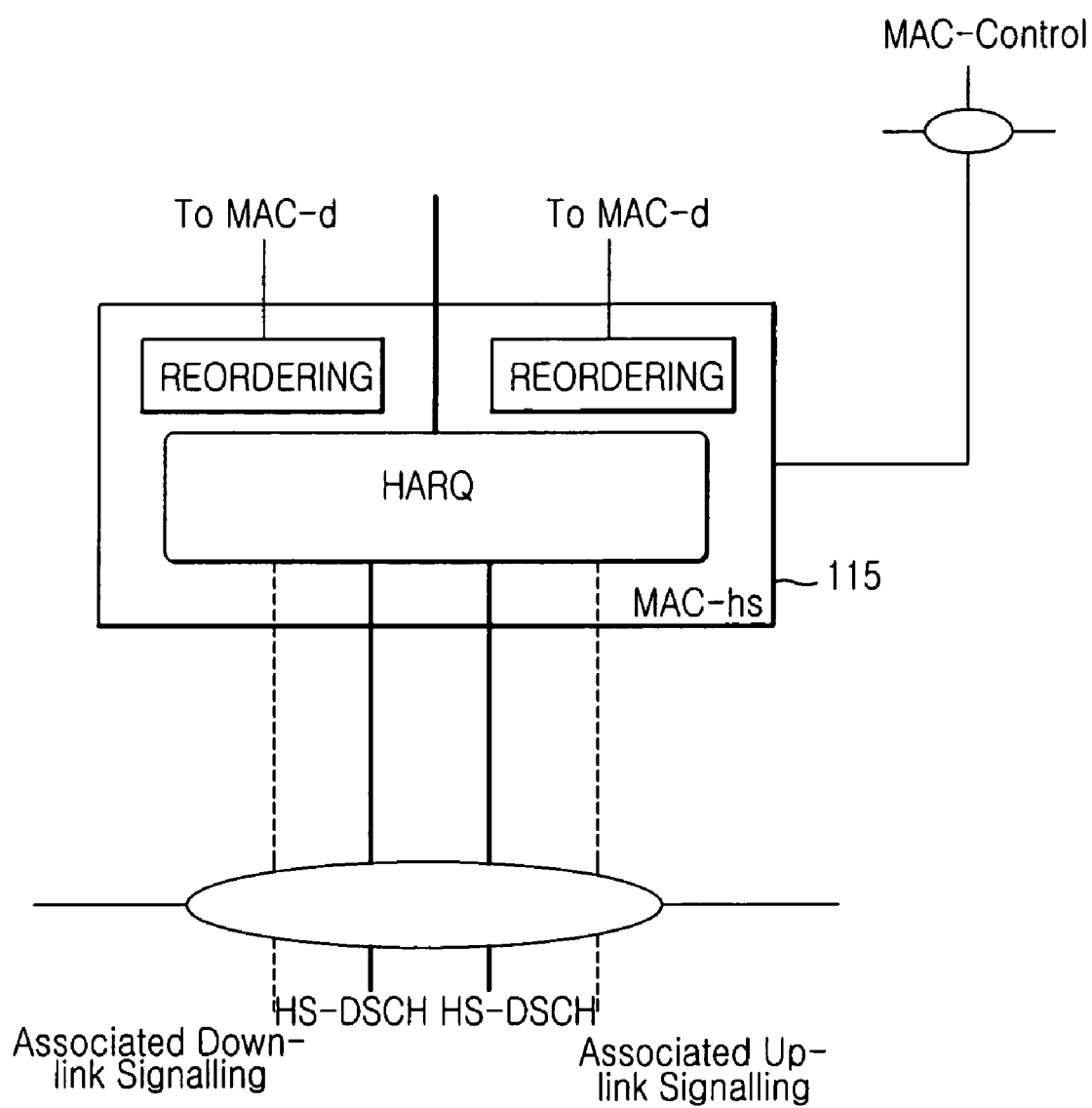
FIG. 2 is a view illustrating the MAC-hs layer architecture of a UE (User Equipment) side in a CDMA (Code Division Multiple Access) communication system using an HSDPA (High Speed Downlink Packet Access) scheme.
Figure 3A:
FIG. 3A illustrates a method for enabling the transmitter to process data blocks according to a transmitter window in an HSDPA communication system.
Figure 3A:
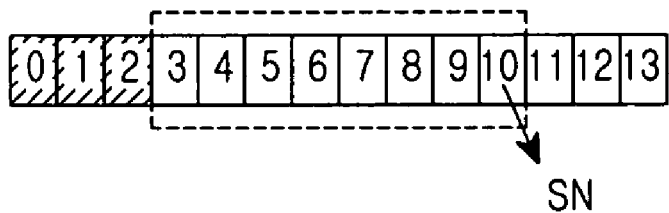
Figure 3B:
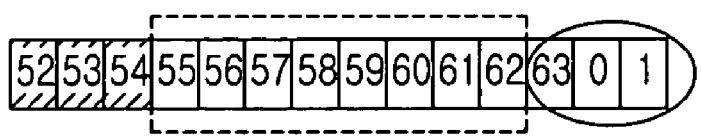
FIG. 3B illustrates a method for enabling the receiver to process data blocks according to a receiver window in the HSDPA communication system.
Figure 4:
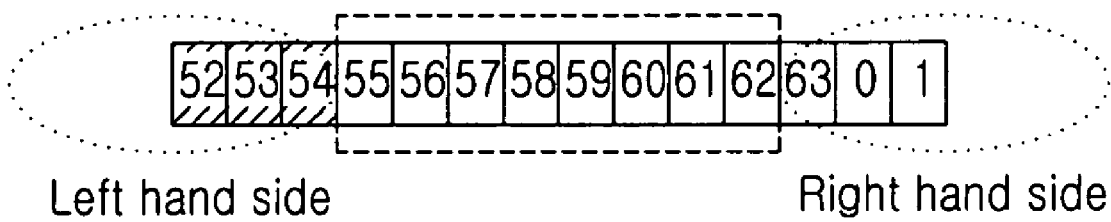
FIG. 4 illustrates a method for enabling the conventional receiver to process data blocks according to a receiver window size in the HSDPA communication system.
Figure 5:
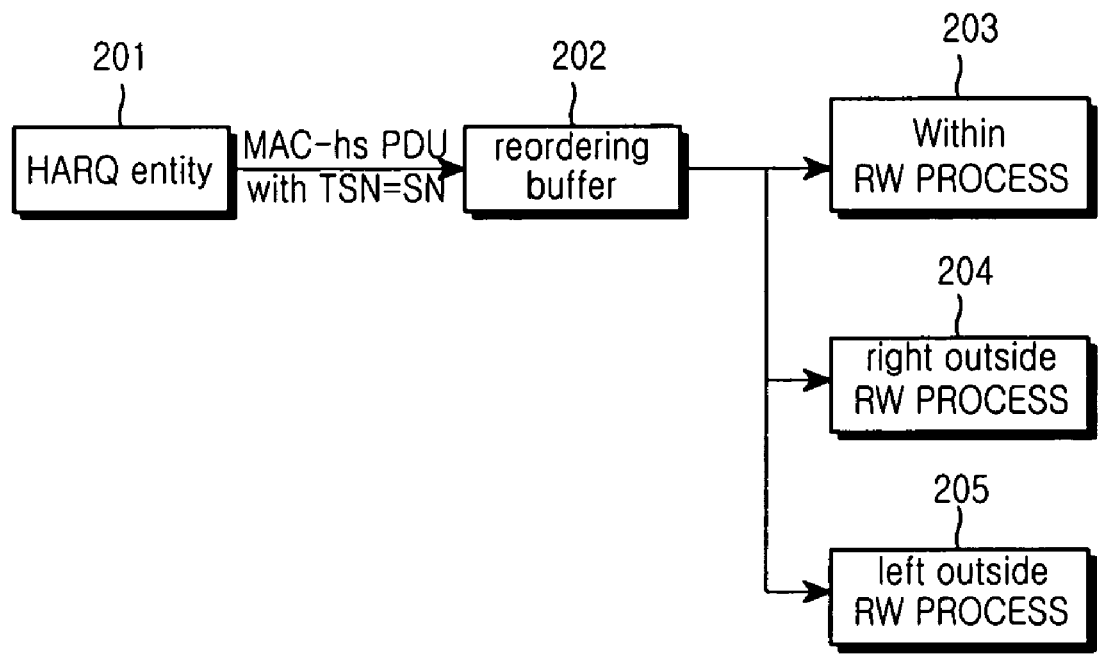
FIG. 5 illustrates a method for processing PDUs (Protocol Data Units) in accordance with the present invention.

FIG. 5 illustrates a method for processing PDUs (Protocol Data Units) in accordance with the present invention. Referring to FIG. 5, the case where TSNs of received PDUs are placed within a receiver window (Process 203), the case where the TSNs of received PDUs are placed at a left side of the receiver window (Process 205) and the case where the TSNs of the received PDUs are placed at a right side of the receiver window (Process 204) when a HARQ (Hybrid Automatic Retransmission Request) entity 201 of a receiver receives the MAC-hs PDUs and the received MAC-hs PDUs are provided to a reordering buffer 202 in accordance with the present invention are considered.

(1) If TSN=SN of a received MAC-hs PDU is within a current receiver window, a receiver (UE) stores a received data block at a position indicated by the TSN in the reordering buffer when the receiver (UE) has not previously received the data block with TSN=SN placed within the receiver window.

(2) If TSN=SN of a received MAC-hs PDU is outside the receiver window, the receiver (UE) processes the PDU according to the case where the TSN of the PDU is placed at the left side of the receiver window (Process 205) or the case where the TSN of the PDU is placed at the right side of the receiver window (Process 204).

I) If TSN=SN of the MAC-hs PDU is placed at the left side of the receiver window, the SN of the MAC-hs PDU is smaller than the TSN of the lower edge of the receiver window and SN<(RWUE−Receiver_Window_Size). In this case, the MAC-hs PDU must be discarded because the TSN cannot be transmitted by the transmitter.

II) If TSN=SN of the MAC-hs PDU is placed at the left side of the receiver window, (RWUE+TRANSMIT_WINDOW_SIZE) is smaller or larger than 64 in a 6-bit TSN system.

Where (RWUE+RxWindow)≧64, a data block with the TSN between (RWUE+1) and 63 or the TSN between 0 and (RWUE+RxWindow)%64 is stored in the reordering buffer, and a data block with the TSN between ((RWUE+RxWindow)% 64+1) and (RWUE−RxWindow) is discarded. The "%" is a symbol of "modulo operation". For example, 3%5=3, 7%5=2. The function of this symbol is the same as "Mod" operation of calculator in Windows 2000.

Where (RWUE+RxWindow)<64, the MAC-hs PDU is stored at a corresponding position of the reordering buffer according to SNs, and the receiver window is advanced. MAC-hs PDU(s) of the reordering buffer pushed outside the receiver window according to the advancement of the receiver window is (are) transferred to the higher layer.

Figure 6:
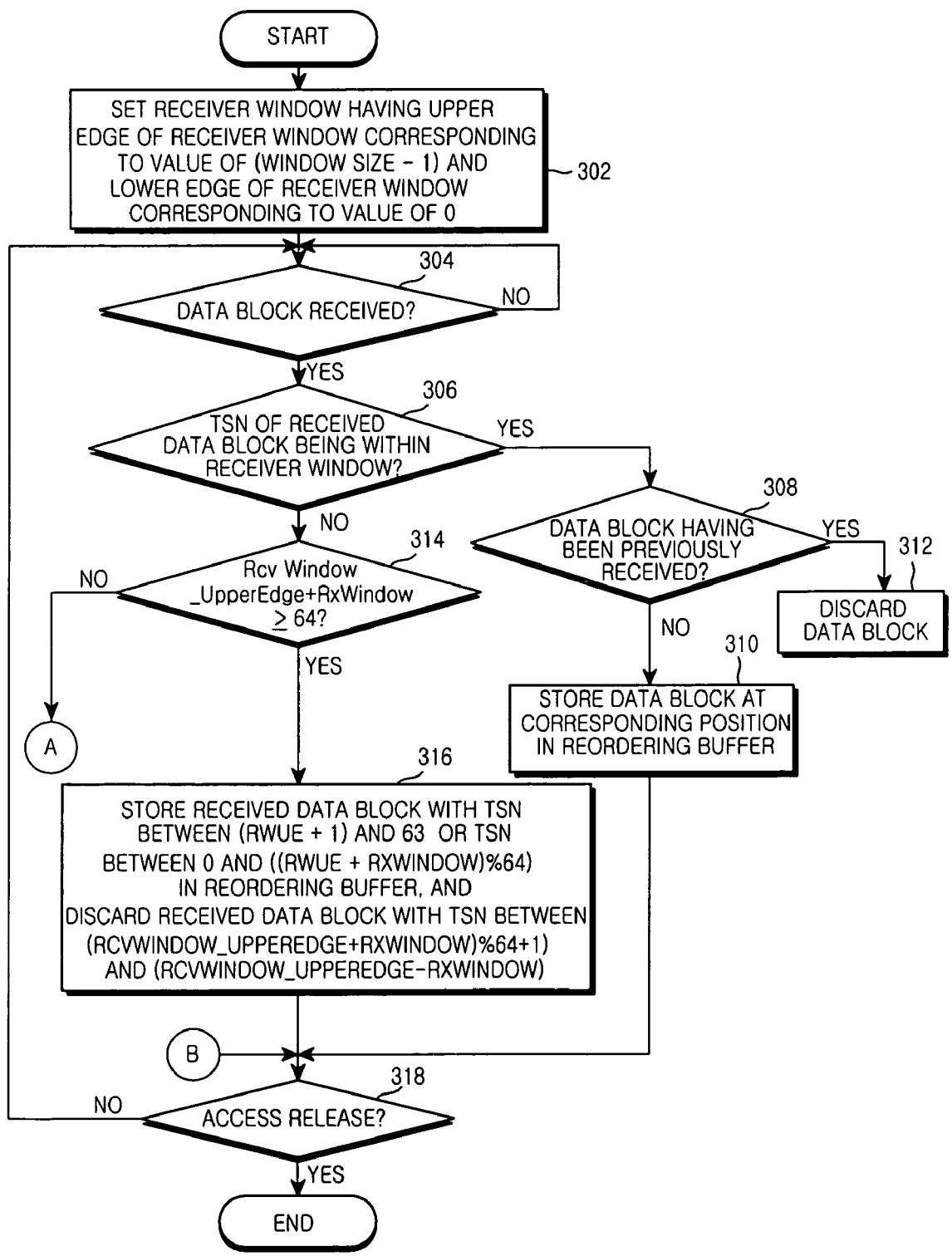
FIGS. 6 and 7 are flow charts illustrating a method for enabling a receiver to process the PDUs in accordance with the present invention.
Figure 7:
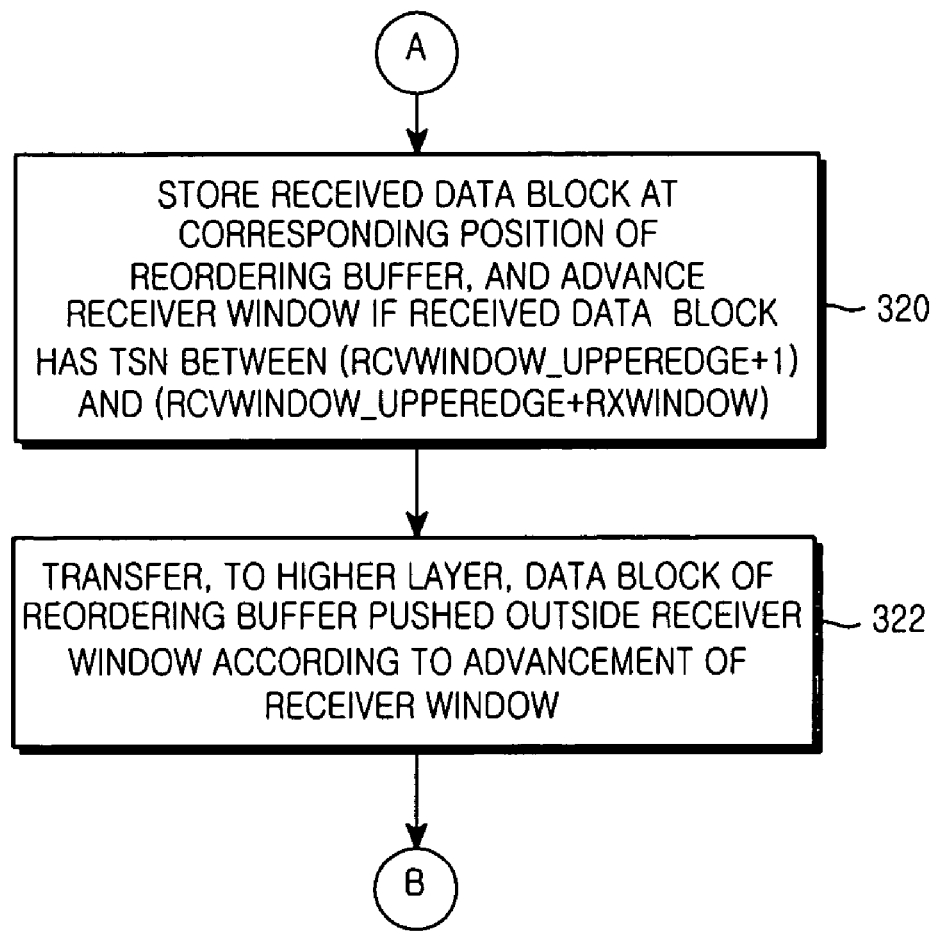

FIGS. 6 and 7 are flow charts illustrating a method for enabling a receiver to process the PDUs in accordance with the present invention; and FIG. 8 illustrates the PDUs for the PDU processing method in accordance with the present invention.

In accordance with the present invention, the receiver of the HSDPA communication system initializes the upper edge of the window to (RxWindow−1), and initializes the lower edge of the window to 0 at step 302. The receiver determines whether a MAC-hs PDU with TSN=SN is received at step 304. If the MAC-hs PDU with TSN=SN is received, the method proceeds to step 306. At step 306, a determination is made as to whether the MAC-hs PDU has the TSN within the receiver window. If the MAC-hs PDU has the TSN within the receiver window, the method proceeds to step 308. At step 308, a determination is made as to whether the MAC-hs PDU has been previously received. If the MAC-hs PDU has been previously received, a corresponding MAC-hs PDU is discarded at step 312. However, if the MAC-hs PDU has not been previously received, a corresponding MAC-hs PDU is stored at a position of the TSN in the reordering buffer at step 310.

If the receiver determines that the TSN of the received MAC-hs PDU is outside the receiver window at step 306, at step 314, it is determined whether (RcvWindow_UpperEdge+RxWindow) is equal to or larger than 64.

Although the TSN of the received MAC-hs PDU is outside the receiver window, a data block with the TSN to be received from the transmitter is stored in the reordering buffer. However, if a value of (RcvWindow_UpperEdge+RxWindow) is larger than 64, the received MAC-hs PDU cannot be a previously transmitted MAC-hs PDU even though the TSN of the MAC-hs PDU is outside the receiver window or smaller than (RcvWindow_UpperEdge). Conventionally, whether the MAC-hs PDU with the TSN of (RcvWindow_UpperEdge+RxWindow) is larger than 64 is not considered. However, a determination is made as to whether the MAC-hs PDU must be received or discarded according to a predetermined criterion where the TSN of (RcvWindow_UpperEdge+RxWindow) associated with the received MAC-hs PDU is larger than 64 in accordance with the present invention.

The receiver of the present invention proceeds to step 316 if the TSN of (RcvWindow_UpperEdge+RxWindow) associated with the received MAC-hs PDU is larger than 64. If the received MAC-hs PDU has the TSN between (RWUE+1) and 63 or the TSN between 0 and ((RWUE+RxWindow)%64), it is stored in the reordering buffer. Further, the receiver discards the received MAC-hs PDU having the TSN between ((RcvWindow_UpperEdge+RxWindow)%64+1) and (RcvWindow_UpperEdge-RxWindow) at the above step 316.

Figure 8A:
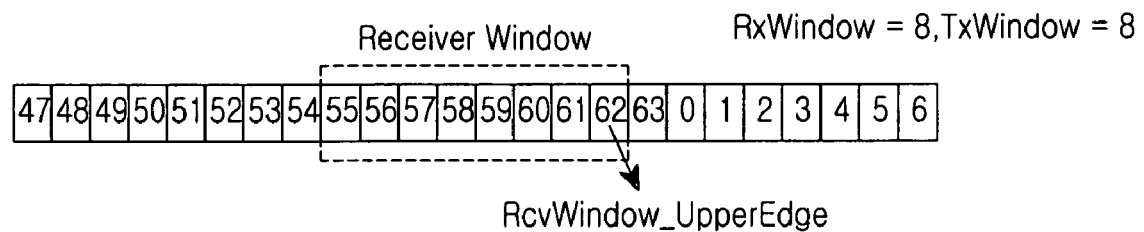
FIGS. 8A and 8B illustrate PDUs for the PDU processing method in accordance with the present invention.

Referring to FIG. 8A, a procedure of processing a MAC-hs PDU where the TSN of (RcvWindow_UpperEdge+RxWindow) associated with the received MAC-hs PDU is larger than 64 will be described as an example. If the TSN of the received MAC-hs PDU is 5 in FIG. 8A, the TSN is outside the receiver window. Because the TSN of the upper edge of the receiver window is 62, the TSN of (RcvWindow_UpperEdge+RxWindow) is 67. Accordingly, 5 being the TSN of the received MAC-hs PDU is within a range of 0~((RcvWindow_UpperEdge+RxWindow)%64), i.e., a range of 0~6, the received MAC-hs PDU is stored in the reordering buffer.

Referring back to FIG. 6, the receiver proceeds to step 320 shown in FIG. 7 if (RcvWindow_UpperEdge+RxWindow) is smaller than 64 at step 314. If the received MAC-hs PDU has the TSN between (RcvWindow_UpperEdge+1) and (RcvWindow_UpperEdge+RxWindow), the receiver stores the received MAC-hs PDU at a corresponding position of the reordering buffer and advances the receiver window at the above step 320. At step 322, the receiver transfers, to the higher layer, MAC-hs PDU(s) of the reordering buffer pushed outside the receiver window according to the advancement of the receiver window. Further, the receiver discards the received MAC-hs PDU with the TSN of from ((RcvWindow_UpperEdge+RxWindow)+1) to 63 or the TSN of from 0 to (RcvWindow_UpperEdge-RxWindow).

Figure 8B:
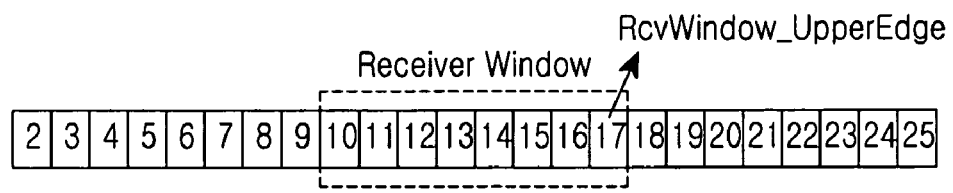

Referring to FIG. 8B, a procedure of processing a MAC-hs PDU where the TSN of (RcvWindow_UpperEdge+RxWindow) associated with the received MAC-hs PDU is smaller than 64 will be described as an example. When the TSN of the received MAC-hs PDU is 20, the TSN is outside the receiver window as illustrated in FIG. 8B. Where the TSN of the upper edge of the receiver window is 17, the TSN of (RcvWindow_UpperEdge+RxWindow) is 25. Because 25 being the TSN of the received MAC-hs PDU is within a range of (RcvWindow_UpperEdge+1)~(RcvWindow_UpperEdge+RxWindow), i.e., a range of 18~25, the received MAC-hs PDU is stored in the reordering buffer.

The present invention addresses problems associated with an already received MAC-hs PDU due to sequence number ambiguity in a receiver although a receiver appropriately receives the MAC-hs PDU, such that the receiver can correctly determine whether the MAC-hs PDU must be received or discarded according to a predetermined criterion. Further, the present invention prevents a data retransmission or loss occurring when a MAC-hs PDU cannot be appropriately transferred to a higher layer.

Although the preferred embodiments of the present invention have been disclosed for illustrative purposes, those skilled in the art will appreciate that various modifications, additions and substitutions are possible, without departing from the scope of the invention. Accordingly, the present invention is not limited to the above-described embodiments, but the present invention is defined by the claims, which follow, along with their full scope of equivalents.

What is claimed is:

1. A method for processing PDUs (Protocol Data Units) in a receiver, which can receive a PDU to which a TSN (Transmission Sequence Number) is allocated from a transmitter, and storing the received PDU in the receiver, in an HSDPA (High-Speed Downlink Packet Access) communication system, the method comprising the steps of:

setting, in the receiver, a range of a receiver window associated with PDUs to be received; and when a sum of a TSN of a PDU at an upper edge of the receiver window and a value of the set receiver window range is larger than a value of a total TSN of PDUs to be received if a TSN of the received PDU is outside of the set receiver window range, storing the received PDU in a reordering buffer if the TSN of the received PDU is within a predetermined range even though the TSN of the received PDU is smaller than the TSN of the PDU at the upper edge of the receiver window.

2. The method as set forth in claim 1, further comprising the step of:

when the sum of the TSN of the PDU at the upper edge of the receiver window and the value of the set receiver window range is smaller than the value of a total TSN size PDUs to be received if the TSN of the received PDU is outside of the set receiver window range, storing a PDU with a TSN previous to TSNs of the receiver window in the reordering buffer.

3. The method as set forth in claim 1, further comprising the step of:

when the sum of the TSN of the PDU at the upper edge of the receiver window and the value of the set receiver window range is smaller than the value of a total TSN size PDUs to be received if the TSN of the received PDU is outside of the set receiver window range, discarding a PDU with a TSN subsequent to TSNs of the receiver window in the reordering buffer.

4. A receiver for processing PDUs (Protocol Data Units) for receiving a PDU to which a TSN (Transmission Sequence Number) is allocated from a transmitter, and for storing the received PDUs, in an HSDPA (High-Speed Downlink Packet Access) communication system, the receiver comprising:

a HARQ (Hybrid Automatic Retransmission reQuest) entity for setting a range of a receiver window associated with PDUs to be received in the receiver, determining whether a sum of a TSN of a PDU at an upper edge of the receiver window and a value of the set receiver window range is larger than a value of a total TSN of PDUs to be received if a TSN of the received PDU is outside of the set receiver window range, and storing the received PDU in a reordering buffer if the TSN of the received PDU is within a predetermined range even though the TSN of the received PDU is smaller than the TSN of the PDU at the upper edge of the receiver window; and the reordering buffer for storing the received PDU according to a control of the HARQ entity.

5. The apparatus of claim 4, further comprising:

when the sum of the TSN of the PDU at the upper edge of the receiver window and the value of the set receiver window range is smaller than the value of a total TSN size of PDUs to be received if the TSN of the received PDU is outside of the set receiver window range, the HARQ entity stores a PDU with a TSN previous to TSNs of the receiver window in the reordering buffer.

6. The apparatus of claim 4, further comprising:

when the sum of the TSN of the PDU at the upper edge of the receiver window and the value of the set receiver window range is smaller than the value of a total TSN size of PDUs to be received if the TSN of the received PDU is outside of the set receiver window range, the HARQ entity discards a PDU with a TSN subsequent to TSNs of the receiver window in the reordering buffer.

* * * * *